# United States Patent [19]

Gilliland

[11] Patent Number: 4,916,881
[45] Date of Patent: Apr. 17, 1990

[54] THE METHOD OF FORMING AN INTERLOCKING JOINT FOR A LEAN-TO STRUCTURE

[75] Inventor: Terry Gilliland, Hayward, Calif.

[73] Assignee: Four Seasons Solar Products Corporation, Holbrook, N.Y.

[21] Appl. No.: 290,153

[22] Filed: Dec. 27, 1988

Related U.S. Application Data

[62] Division of Ser. No. 945,768, Dec. 22, 1986, Pat. No. 4,823,519.

[51] Int. Cl.⁴ .............................................. E04B 7/00
[52] U.S. Cl. .................................................... 52/741
[58] Field of Search ............... 52/93, 639, 640, 641, 52/645, 642, 741; 119/16; 403/403, 382

[56] References Cited

U.S. PATENT DOCUMENTS

| | | |
|---|---|---|
| 214,127 | 4/1879 | Hall . |
| 366,865 | 7/1887 | Newell . |
| 782,639 | 2/1905 | Bailey . |
| 907,554 | 12/1908 | Ansbach . |
| 1,119,896 | 4/1914 | Stiles ........................................ 52/93 |
| 1,378,448 | 5/1921 | Gilbert ...................................... 52/93 |
| 1,672,419 | 6/1928 | Lehman . |
| 1,847,925 | 3/1932 | Carter . |
| 1,922,994 | 8/1933 | Voigt . |
| 3,328,056 | 6/1967 | Heiken . |
| 4,285,176 | 8/1981 | Runkle . |
| 4,352,588 | 10/1982 | Davies, III . |
| 4,586,300 | 5/1986 | Mullin . |

FOREIGN PATENT DOCUMENTS

| | | |
|---|---|---|
| 3428184 | 2/1986 | Fed. Rep. of Germany . |
| 355228 | 8/1905 | France . |
| 864520 | 4/1961 | United Kingdom .................... 52/93 |

*Primary Examiner*—John E. Murtagh
*Attorney, Agent, or Firm*—Ladas & Parry

[57] ABSTRACT

A lean-to construction is provided in which a horizontal beam is supported between a supporting structure and a vertical beam spaced from the supporting structure. The vertical and horizontal beams have interengaged end portions and a mortis and tenon joint is provided with a tongue having a configuration to vector the forces resulting from the weight of the horizontal beam into vertical and horizontal forces which urge the vertical beam to tilt towards the horizontal beam and supporting structure, thereby to make the structure more reliable.

6 Claims, 2 Drawing Sheets

THE METHOD OF FORMING AN INTERLOCKING JOINT FOR A LEAN-TO STRUCTURE

This is a divisional of application Ser. No. 945,768 filed 12/22/86, now U.S. Pat. No. 4,823,519.

FIELD OF INVENTION

This invention relates to interlocking joints and particularly to joints used in the construction of lean-to structures such as solariums and greenhouses. The invention also relates to associated methods.

BACKGROUND

Interlocking joints for beams and the like are shown in a variety of patents, including U.S. Pat. Nos. 782,639; 1,672,419; 1,922,994; 3,328,056; and 4,352,588.

U.S. Pat. Nos. 1,672,419 and 3,328,056 are cited merely because they show the use of bolts to lock structural joints together. Aside from that, they have no significant bearing on the structure and method to be disclosed hereinbelow.

S. R. Bailey shows in the U.S. Pat. No. 782,632 an interlocking angle joint in which a plurality of tongues are received in a plurality of grooves or slots. As will become more apparent hereinbelow, the tongue profile, in association with the shape of the associated groove profile, does not achieve any of the results of the invention as will be enumerated hereinafter.

In U.S. Pat. No. 1,922,994, C. G. Voight shows a trimming joint in which a tongue of specialized profile is engaged in an accommodating receptable. The relationship of the profile to the related and abutting end faces of the parts which are connected together are unlike the corresponding relationships in the present application as a consequence of which entirely different results are achieved.

B. Davies shows in U.S. Pat. No. 4,352,588, a rail and stile member of a wood frame joined at a curvilinear edge at abutting facial surfaces. Tenon and mortis connections are employed, but these tenon and mortis connections are of ordinary configuration and do not have the proposed use of urging the members together into tighter relationship as is achieved with the present invention as will be seen hereinbelow.

SUMMARY OF INVENTION

It is an object of the invention to provide an improved tongue and groove or mortis and tenon joint which is adapted for the improved utilization of forces relating from the associated structure.

It is another object of the invention to provide an improved lean-to construction in which a joint connection is employed to improve the reliability of the structure.

Yet another object of the invention is to provide an improved structure and method for improving the integrity of vertical beams when incorporated into structures in which such beams may be urged ordinarily in a structure destroying movement.

In achieving the above and other objects of the invention, there is provided, in accordance with one aspect of the invention, a lean-to structure adapted for being supported against a supporting structure such as a dwelling or factory or the like, the lean-to structure comprising generally vertical and horizontal beams with the vertical beam being spaced from the supporting structure and the horizontal beam extending between and having a weight which is supported by the vertical beam and supporting structure. Moreover, in accordance with the invention there is provided an interengaged means on these beams tending, in response to at least part of the weight of the horizontal beam, to urge the vertical beam to tilt towards the supporting structure.

As will be noted hereinbelow, the beams referred to above have abutting end faces providing a vectoring of a force derived from the weight of the horizontal beam which tends to tilt the vertical beam away from the supporting structure. The first noted arrangement is intended to abate this tilting action and thereby render the structure more reliable. This reliability is further enhanced by the provision of a locking means to fasten the beams together.

In greater detail, the interengaged means referred to hereinabove comprises a tongue and groove arrangement, the tongue having a lower edge and the groove having a floor which is in abutting relationship with the lower edge of the tongue and the two sloping away from the supporting structure. It will be noted from the description which follows hereinbelow that the tongue has a triangular profile and a rectangular cross-section. It will also be seen that the locking means may be a bolt extending through the horizontal beam and tongue into the vertical beam.

In accordance with other features of the invention, the vertical beam includes upstanding and spaced walls defining the aforesaid groove and straddling the tongue. Moreover, it will be noted in a preferred embodiment that the groove extends through the vertical beam in entirety. It will also be noted in a preferred embodiment that the horizontal beam has a lower edge co-extensive with the lower edge of the tongue. Still further, it will be noted that the horizontal beam and the upstanding walls mentioned hereinabove have angular end faces in abutting relationship. As will be seen, the horizontal beam have a slope in the range of from 5° to 75°.

Viewed from another aspect, the invention provides a structure comprising a vertical beam, a sloped beam having a descending angle of slope, said vertical beam and sloped beam, including interengaged end portions having adjacent end faces abutting along a sloped plane. The end portion of the vertical beam has a groove extending at least partly therethrough and the end portion of the sloped beam includes a tongue accommodated in this groove. The groove has a sloped floor and the tongue has a lower face engaging end corresponding in angle to the floor and resting thereagainst.

According to yet another aspect of the invention, there is provided a method which comprises supporting an end portion of a generally horizontal beam on an upper end portion of a generally vertical beam and vectoring forces derived from the weight of the horizontal beam to urge the end portions together.

The above and other objects, features and advantages of the invention will be found in the Detailed Description which follows hereinbelow and as illustrated in the accompanying drawing.

DETAILED DESCRIPTION

Figure 1:
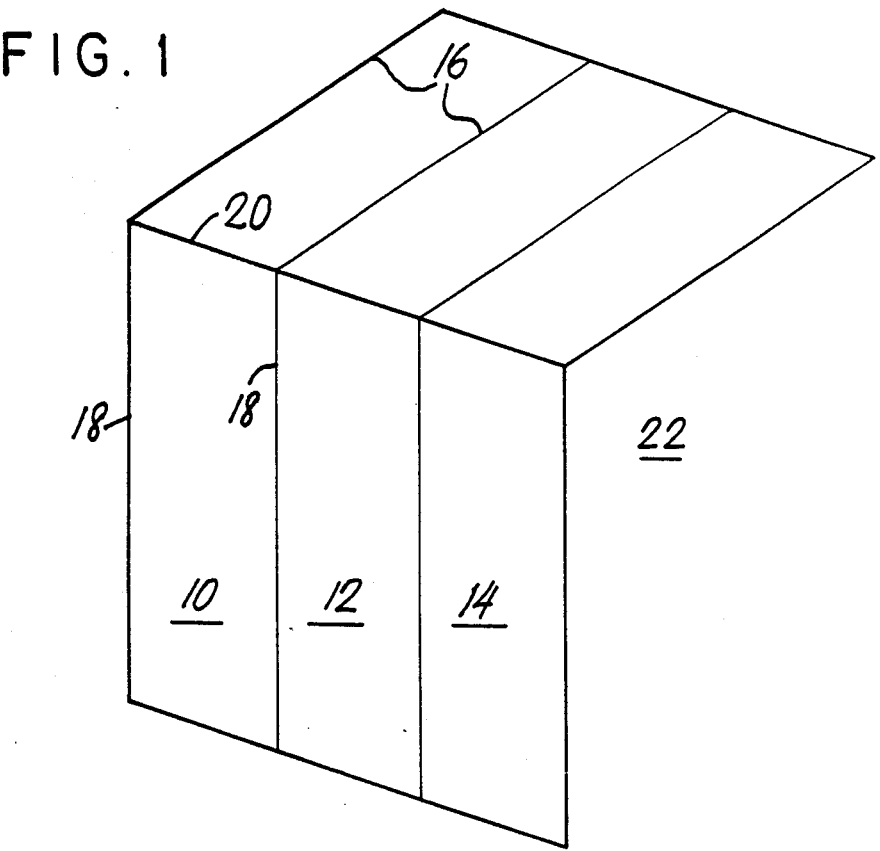
FIG. 1 is a diagrammatic perspective view of a lean-to structure embodying a plurality of bays.

Referring next to the drawing, FIG. 1 shows diagrammatically and in perspective a portion of a lean-to construction consisting of a plurality of bays 10, 12, and 14. The number of bays which is illustrated is not limiting with respect to the invention inasmuch as a greater or lesser number of bays may readily be employed.

Figure 2:
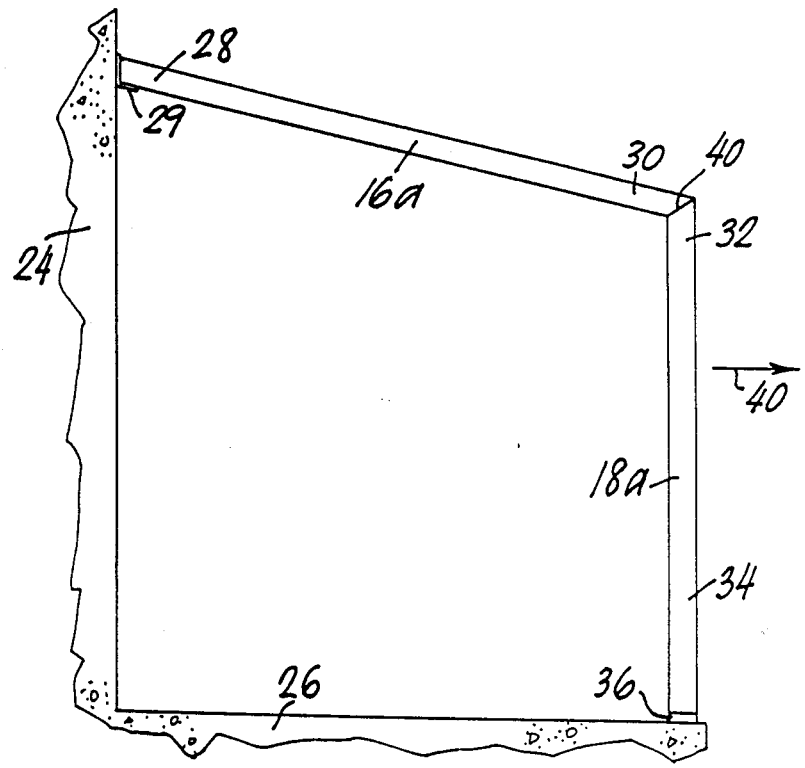
FIG. 2 is a diagrammatic view of the supporting structure for the lean-to construction of FIG. 1, the view further showing the horizontal and vertical beam relationship employed in a preferred embodiment of the invention.

The structure consists of a plurality of generally horizontal wooden beams 16 and a plurality of generally vertical beams 18. These beams meet along an edge indicated at 20. In between the vertical and horizontal beams are panes of glazing such as glass which serve to define an interior space 22 which is isolated from the ambient atmosphere by the aforesaid glazing supported by the various beams. The connection between the glazing and the beams is not essential to an understanding of the present invention, and consequently will not be described in detail in this text. Referring next to FIG. 2, there will be seen a supporting structure 24 which may be the side wall of a dwelling, a factory or the like. Also will be seen a base 26 which may be fabricated, for example, of concrete or the like. Also illustrated in this figure is a particular vertical beam 18(a) and a particular horizontal beam 16(a). Parallel vertical and horizontal beams may be of like construction.

To support end portion 28 of the illustrated horizontal beam on the supporting structure 24, there is provided a ridge bar indicated at 30. This ridge bar is fabricated with such a configuration as to receive the end portion 28 of the associated horizontal beam. The opposite end portion 30 of the horizontal beam is received against and supported by the upper end portion 32 of the associated vertical beam. This vertical beam, as do all the other vertical beams, has a lower end portion or foot indicated generally at 34 and received against a supporting structure as indicated at 36. The lower end portion or foot 34 constitutes a pivot about which the vertical beam 18(a) may undesirably pivot when subjected to forces such as caused by the weight of the beam 16(a) or snow loads or the like which may be superposed thereupon. The weight of the beam 16(a) is distributed between the supporting structure 24 and the vertical beam 18(a). The portion of the weight supported by the beam 18 (a) is vected because of the sloped end faces of the horizontal and vertical beams such as is indicated at 40.

FIGS. 3-6 illustrate the details of the interconnected and associated end portions 30 and 32 of the beams which are under discussion. It will be seen that the upper end portion 30 of the vertical beam terminates in two upstanding walls 42 and 44 defining a slot or groove 46 therebetween. It will be noted that this groove extends completely through the upper end portion 30 in the preferred embodiment of the invention.

It will also be noted that the end portion 30 of the horizontal beam 16(a) is provided with a tongue 48 intended to be accommodated in the groove or slot 46. The profiles and dimensions of the tongue and groove of this tongue and groove arrangement are matched. Therefore, it will be seen that the groove 46 has a triangular profile to accommodate the triangular profile of the tongue 48, this profile being indicated at 50 and being bounded by the walls 52 and 54 and by the line 56 indicating the end face 58 of the end portion 30. It will also be noted that the tongue 48 has a rectangular shape as indicated by an inspection of the face 54. The end faces or top edges of the walls 42 and 44 are indicated at 60 and 62. These end faces slope at the same angle as the end faces 58 with which they are in face-to-face abutting relationship.

It should further be noted that the lower edge or bottom face 66 of the horizontal beam 16(a) slopes at the same angle as the bottom wall 52 of the tongue 48, these two faces or edges being co-extensive with one another.

Figure 6:
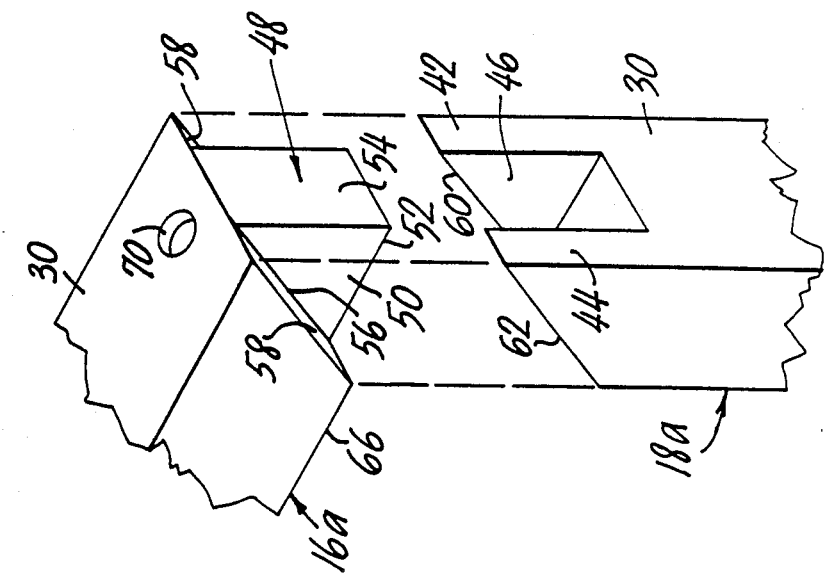
FIG. 6 is an exploded view of the interengaged portions of the horizontal and vertical beams provided in accordance with the invention.
Figure 3:
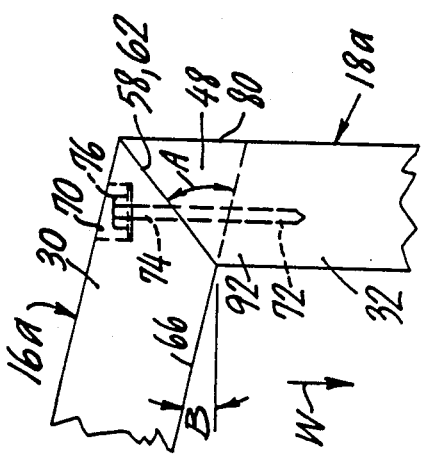
FIG. 3 is a side view of the interengaged end portions of the horizontal and vertical beams of FIG. 2.

Further seen in FIG. 6 is a bore or opening 70 through which a bolt or other such fastening device is inserted. As appears in FIGS. 3-5, this bolt passes through the end portion 30 through the opening 70 and through the tongue 48 as well as into the end portion 32 at the top of the vertical beam 18(a). In FIG. 3 will also be seen the angle of slope of the bottom edge or face of the beam 16(a). This angle being indicated at B in FIG. 3. The angle of the end faces indicated at 58 and 62 in FIGS. 3 and 6 is denoted at A. Angles A and B will be discussed in greater detail hereinbelow. It should be noticed that the angle B is in the order of magnitude of 14° or 15° with a preferred range existing from 5°–75°. Angle A is in the order of magnitude of 45° and preferably lies in the range of from 30°–60°.

FIG. 3 is a side view of the connecting joint of the invention. As such, the bolt which is designated at 72 is shown in phantom lines. This bolt may be any type of fastening device. The fastening device is preferably countersunk as indicated by the provision of the hole 70 which is of greater diameter than the bore 74 into which the bolt is inserted. As indicated hereinabove, the bolt passes through the end portion 30 and through the tongue 48 into the upper end portion 32 of the vertical beam 18 (a). Preferably, there is a threaded or screw engagement in the portion of the bolt inserted into the upper end portion 32. The bolt is provided with a head 76 which limits the extent to which the bolt can penetrate into the aforenoted structure.

Figure 4:
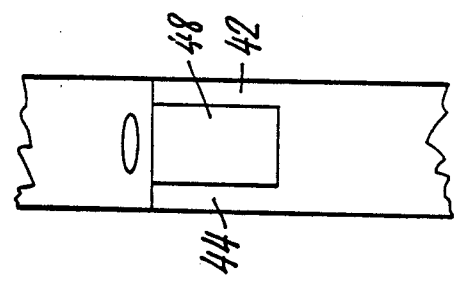
FIG. 4 is a front view of the structure of FIG. 3.

FIG. 4 shows the rectangular cross-section of the tongue 48 which is accommodated between the upstanding walls 42 and 44. The drawings are intended to show that the triangular profiles of the tongue and the receiving groove are matched so that the outer extremity of the tongue 48 is flush with the outer wall of the beam 18(a) as indicated, for example, at 80 (see FIG. 3).

Figure 5:
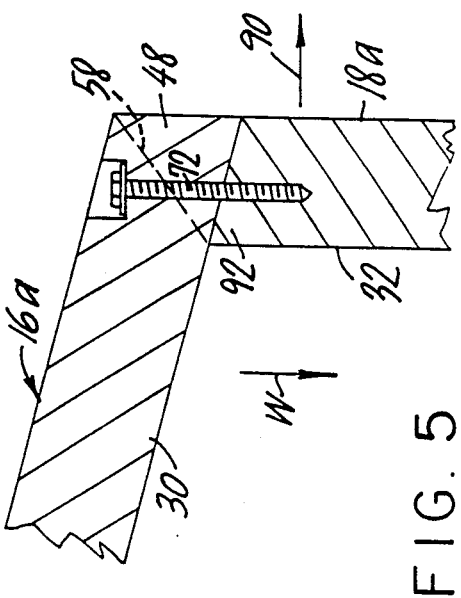
FIG. 5 is a sectional view of the structure of FIG. 3.

Inasmuch as FIG. 5 is a cross-section, the end portions 30 and 32 are shown in section. The tongue 48 is shown in solid lines with the hidden end face 58 of the end portion 30 being indicated in dotted lines. The bolt 72 is also shown in solid lines being exposed in this sectional view. The weight of the horizontal beam 16(a) is indicated in FIGS. 3 and 5 by arrow W. The distribution of this weight and the vectoring of the forces resulting therefrom are intended to abate any condition whereby the vertical beam 18(a) might tilt outwardly away from the associated supporting structure as indicated by the arrow 90 in FIGS. 2 and 5. Stated otherwise, the weight of the beam 16(a) acting against the vertical beam 18(a) at faces 58, 62 will tend to make the vertical beam 18(a) tilt outwardly away from the supporting structure 24 (see FIG. 2) thus decreasing the reliability of the structure. One of the primary objects of the invention is to lessen this tendency and to vector the forces in such a manner as to tend to urge the vertical beam 18(a) more tightly against the horizontal beam 16(a) at faces 58, 62 and thereby to urge the beam 18(a) to tilt in the opposite direction to arrow 90 and thereby towards the supporting structure 24. How this is accomplished theoretically is next referred to hereinbelow.

Since the weight W of the horizontal beam (including snow loads, etc.) is supported at two places (i.e., by the vertical beam and by the supporting structure), let is be assumed that the weight w supported by the vertical beam is $$w = W/2$$

Let is also be assumed (as an acceptable approximation and ignoring the slope of the horizontal beam) that the weight w is vectored into two forces, one of which works vertically downward on the vertical beam and is compressive along the longitudinal axis of the vertical beam and can therefore be ignored. The other force (which works in shear on the bolt connecting the beams and which also tends to tilt the vertical beam about its foot and outwardly away from the supporting structure) is as an approximation $$F_1 = W/2 \cos A$$

wherein A is the angle of slope of the end face of the horizontal beam along which the two beams abut.

However, in accordance with the invention, force $F_1$ is helpfully abated by $F_2$ resulting from the angle B of slope of the bottom edge of the tongue which is also the angle of slope of the floor of the groove in which the tongue is received. This force may be approximated as $$F_2 = W/2 \cos B$$

The result is that $F_1$ is abated by $F_2$ thereby decreasing the shear through the bolt and decreasing the tendency of the vertical beam to tilt outwardly. This may be expressed as a force $\Delta$ where $$\Delta = W/2 \cos A - W/2 \cos B$$

which reduces to $$\Delta = W/2 (\cos A - \cos B)$$

Although various approximations have been made, the above will serve to show how benefits are derived from the invention in addition to the fact that the slope of the tongue effectively locks the vertical beam in against outward tilt.

From the above, it will be seen that the invention provides a method which comprises supporting an end portion of a generally horizontal beam on an upper end portion of a generally vertical beam and by vectoring forces derived from the weight of the horizontal beam urged the end portions together to accomplish the aforenoted results. This is achieved by forming the beams with an interengaged tongue and groove to vector said forces. The interengaged tongue and groove furthermore operates, especially with the action of the associated fastening device 72, to lock the vertical beam 18(a) against outward movement or tilting about the foot portion 34. This is a result of the apex indicated at 92 in FIGS. 3 and 5 which is in a position of interference with the tongue 48 upon any attempt of the vertical beam 81(a) to tilt outwardly.

Stated otherwise, the mitred angles defined by surfaces 58 and 62 tend to direct vertical member 18 in a direction away from wall 24, as more weight is added to the horizontal member 16, in the direction of arrow (W) due, for example, to snow or dead loads, etc. To offset the movement in the direction away from wall 24 internally mitred face 52 and the opposed face are employed which tend to direct vertical member 18 in a direction towards wall 24 as weight is added to horizontal member 16. These opposing mitred surfaces tend to create a tight mitred joint, joining parts 16 and 18.

The method of fabricating the special mortise and tenon angles of the invention so as to provide the appearance of a mitred joint with the advantages of an interlocking joint tends to keep the mitred joint tightly compressed. The interlocking joint tends to compress itself and lock itself more tightly together as more weight is applied to the angled horizontal upper section.

The method of the invention more specifically comprises forming a lean-to structure of generally vertical and horizontal beams and supporting the lean-to structure against a supporting structure. The vertical beam is spaced from the supporting structure and the horizontal beam is supported between the vertical beam and supporting structure. The beams are formed with interengaged portions in the shapes of a mating tongue and groove. The tongue is inserted into the groove.

The horizontal beam is supported atop the vertical beam on oppositely sloped surfaces atop the vertical beam in order to counterbalance, at least partly, vectored forces gravitationally developed by the horizontal beam whereby to minimize the possibility of tilting the vertical beam away from the supporting structure.

As noted hereinabove, a fastener is inserted vertically through the tongue into the top of the vertical beam. The sloped surfaces are formed preferably as planar surfaces and the tongue is formed with a triangular profile. The surfaces are formed so that each such surface extends entirely across the top of the vertical beam in directions going towards and away from the supporting structure. The top of the vertical beam is as noted hereinabove shaped to embrace the tongue of the horizontal beam.

There will now be obvious to those skilled in the art many modifications and variations of the structure and methods set forth hereinabove. These modifications and variations will not depart from the scope of the invention if defined by the following claims, or the functional equivalents thereof.

What is claimed is:

1. A method of forming a lean-to structure of generally vertical and horizontal wooden beams and supporting the lean-to structure against a supporting structure, said method comprising forming the beams with interengageable portions in the shapes of mating tongue and groove while forming the top of the vertical beam with side-by-side oppositely sloped surfaces, the horizontal beam being formed at an end thereof with two parallel sloped surfaces bracketing said groove, spacing the vertical beam from the supporting structure and supporting the horizontal beam between said vertical beam and supporting structure while inserting the tongue into the groove, and supporting the horizontal beam atop the vertical beam on the oppositely sloped surfaces atop the vertical beam in order to counterbalance, at least partly, vectored forced gravitationally developed by the horizontal beam whereby to minimize the possibility of tilting the vertical beam away from said supporting surfaces atop the vertical beam and the sloped surfaces at the end of the horizontal beam being placed against the other sloped surfaces atop the vertical beam.

2. A method as claimed in claim 1 comprising inserting a fastener vertically through the tongue into the top of the vertical beam.

3. A method as claimed in claim 1 wherein the sloped surfaces are formed as planar surfaces.

4. A method as claimed in claim 1 comprising forming the tongue with a triangular profile.

5. A method as claimed in claim 3 comprising forming said surfaces so that each said surface extends entirely across the top of the vertical beam in directions going towards and away from the supporting structure.

6. A method as claimed in claim 5 wherein the top of the vertical beam is shaped to embrace the tongue of the horizontal beam.

* * * * *